United States Patent [19]
Cook

[11] Patent Number: 5,508,324
[45] Date of Patent: Apr. 16, 1996

[54] ADVANCED POLYAMINE ADDUCT EPOXY RESIN CURING AGENT FOR USE IN TWO COMPONENT WATERBORNE COATING SYSTEMS

[75] Inventor: Michael I. Cook, Emmaus, Pa.

[73] Assignee: Air Products and Chemicals, Inc., Allentown, Pa.

[21] Appl. No.: 515,091

[22] Filed: Aug. 14, 1995

[51] Int. Cl.$^6$ .............................. C08K 3/20; C08L 63/00
[52] U.S. Cl. ......................... 523/404; 525/526; 528/103
[58] Field of Search ........................... 523/404; 525/526; 528/103

[56] References Cited

U.S. PATENT DOCUMENTS

| | | | |
|---|---|---|---|
| 4,134,864 | 1/1979 | Belanger | 528/113 |
| 4,197,389 | 4/1980 | Becker et al. | 528/103 |
| 4,246,148 | 1/1981 | Shimp et al. | 260/18 EP |
| 4,539,347 | 9/1985 | DeGooyer et al. | 523/404 |
| 4,608,405 | 8/1986 | DeGooyer | 523/404 |
| 5,221,700 | 6/1993 | Gilbert et al. | 523/404 |
| 5,246,984 | 9/1993 | Darwen et al. | 523/404 |

*Primary Examiner*—Frederick Krass
*Attorney, Agent, or Firm*—Michael Leach; William F. Marsh

[57] ABSTRACT

An epoxy resin curing composition comprising the product of the reaction of (A) a polyamine containing primary amine functionality and (B) a polyepoxide having an EEW of from 130 to 450 in a ratio of moles of polyamine per equivalents of polyepoxide sufficient to provide intermediate (C) which comprises an adduct of about two moles of polyamine and one mole polyepoxide, intermediate (C) being then reacted with an amount of a polyepoxy resin (D) sufficient to react with about 10–40% of the primary amines in intermediate (C) to provide adduct (E), and adduct (E) being end capped with a monoepoxide composition comprising an aromatic glycidyl ether or an alkyl substituted aromatic glycidyl ether, or both. The composition may be salted with a volatile acid such as acetic acid and blended with water to afford an aqueous composition containing 20 to 65% nonvolatiles.

31 Claims, No Drawings

ADVANCED POLYAMINE ADDUCT EPOXY RESIN CURING AGENT FOR USE IN TWO COMPONENT WATERBORNE COATING SYSTEMS

TECHNICAL FIELD OF THE INVENTION

This invention relates to water dispersible polyamine-epoxy adducts which can be used as a curative for epoxy resin systems.

BACKGROUND OF THE INVENTION

Due to more stringent environmental regulations, particularly with respect to reduced volatile organic compounds, (VOC), there is a drive within the coatings industry to switch from conventional solvent borne systems to waterborne coatings. Although aqueous polyepoxide coating systems based on polyamine adducts are known, there have been several problems associated with these systems. For example, many aqueous systems do not possess a high degree of compatibility between resin and amine components. This incompatibility can lead to an inability of the system to properly wet the substrate and form a continuous coating which, in turn, can lead to poor coating appearance and poor adhesion to the surface of the substrate. The working pot life of several commercial aqueous epoxy coating compositions can be too short and as a result systems cannot be used in certain industrial applications.

U.S. Pat. No. 5,246,984 describes water compatible polyamine adducts formed by the reaction of a polyamine with a mixture of monoepoxides and polyepoxides. The resultant mixture is further reacted with formaldehyde which results in the methylolation of the primary amine hydrogens. This is a way of reducing the primary amine content of the product so as to extend pot life in a liquid resin system.

U.S. Pat. No. 4,539,347 describes curing agents based on the reaction product from a multi-functional epoxy novolac resin and a polyamine, wherein the remaining primary amines are reacted with a monoepoxide or a monocarboxylic acid.

U.S. Pat. No. 4,246,148 discloses a polyamine terminated difunctional epoxy adduct which is end capped with a combination of both aliphatic and aromatic monoepoxides.

U.S. Pat. No. 4,608,405 describes curing agents that are based upon an epoxidized polyol containing aromatic and polyalkylene ether moieties in which all the epoxide groups are reacted with a polyamine wherein each primary amine in the resulting reaction product is further reacted with a monoepoxide or a monocarboxylic acid.

U.S. Pat. No. 4,197,389 describes curing agents prepared by the reaction of a polyepoxide compound, a polyalkylene polyether polyol and a polyamine. The adduct may be further reacted with an unsaturated compound such as acrylonitrile. Curing agents are used to form coating compositions with solid resin dispersions.

SUMMARY OF THE INVENTION

The present invention provides water compatible polyamine-epoxy adducts and curable coating compositions comprising a blend of such polyamine-epoxy adduct and a polyepoxide.

The epoxy resin curing agent comprises the reaction product of a polyamine containing primary amine functionality with a first polyepoxide having an epoxide equivalent weight (EEW) in the range of 130 to about 450 to yield an amine terminated epoxide adduct. The amine terminated epoxide adduct is further advanced via reaction with a second polyepoxide in an amount sufficient to react with about 10-40% of the available primary amines in the adduct. The resulting polyamine-polyepoxide adduct mixture is end capped with a monoepoxide composition comprising an aromatic glycidyl ether and/or alkyl substituted aromatic glycidyl ether. Water compatibility of the curing agent is improved by salting with an acid.

The curing agent can be used in a water based system to cure solid epoxy resin dispersions. Thus, another embodiment of the present invention is a curable coating composition comprising the polyamine-epoxy adduct curing agent and a polyepoxide resin. When applied to metal substrates, the mixture cures at room temperature producing coatings that possess excellent physical and chemical properties.

DETAILED DESCRIPTION OF THE INVENTION

According to the invention the polyamine-epoxy adduct comprises the reaction product of (A) a polyamine containing primary amine functionality and (B) a polyepoxide having an EEW of 130 to about 450, i.e., a low molecular weight epoxide, in a ratio of greater than one mole of polyamine per equivalent of epoxide to yield intermediate (C) which substantially comprises an adduct of about two moles of polyamine and one mole of polyepoxide. This intermediate (C) is further advanced with a polyepoxy resin (D) having an EEW of 450–2000 by reacting about 0.1 to 0.4 moles of polyepoxide per mole of intermediate (C). The resulting polyamine-epoxy adduct is then further reacted with at least one mole aromatic monoepoxide per primary amine in the adduct.

Polyamines useful in the first reaction contain at least two nitrogen atoms per molecule and at least two and preferably at least three active hydrogens attached to nitrogen atoms per molecule. Useful amines include aliphatic, araliphatic, aromatic, cycloaliphatic, and heterocyclic di- and polyamines. Examples include the polyalkylene polyamines, especially the polyethylene polyamines (ethylene diamine, diethylene triamine, triethylene tetramine, pentaethylene hexamine and the like), 1,2-propylene diamine, 1,3-propylene diamine, 1,4-butanediamine, 1,5-pentanediamine, 1,3-pentanediamine, 1,6-hexanediamine, 3,3,5-trimethyl-1,6-hexanediamine, 3,5,5-trimethyl- 1,6-hexane-diamine, 2-methyl-1,5-pentanediamine, bis-(3-aminopropyl)amine, N,N'-bis-( 3-amino-propyl)-1,2-ethanediamine, N-(3-amino-propyl)-1,2-ethanediamine, 1,2-diamino-cyclohexane, 1,3-diaminocyclohexane, 1,4-diaminocyclohexane, aminoethylpiperazine, the poly(alkylene oxide) diamines and triamines (such as for example Jeffamine® D-230, Jeffamine D-400, Jeffamine D-2000, Jeffamine D-4000, Jeffamine T-403, Jeffamine EDR-148, Jeffamine EDR-192, Jeffamine C-346, Jeffamine ED-600, Jeffamine ED-900, and Jeffamine ED-2001), meta-xylylene diamine, phenylene diamine, 4,4'-diaminodiphenyl methane, toluene diamine, isophorone diamine, 3,3'-dimethyl- 4,4'-diaminodicyclohexyl methane, 4,4'-diaminodicyclohexyl methane, 2,4'-di-aminodicyclohexyl methane, the mixture of methylene bridged poly(cyclohexylaromatic)amines (also known as MBPCAA) described in U.S. Pat. No. 5,280,091, and polyaminoamides. Mixtures of the above amines may also be employed.

The preferred polyamines for use in the invention are the polyethylene polyamines, namely ethylenediamine, diethylene triamine and especially triethylenetetramine.

The epoxy component of the first reaction can be any polyepoxide containing about 2 or more 1,2-epoxy groups per molecule and having an EEW of 130 to 450, preferably 130 to 350 and most preferably 170 to 250. Such epoxides are described in Y. Tanaka, "Synthesis and Characteristics of Epoxides", in C. A. May, ed., *Epoxy Resins Chemistry and Technology* (Marcel Dekker, 1988). Examples include epoxides of polyunsaturated organic compounds, oligomers of epihalohydrins, glycidyl derivatives of hydantoin and hydantoin derivatives, glycidyl ethers of polyvalent alcohols, glycidyl derivatives of triazines, and glycidyl ethers of dihydric phenols. Epoxides of polyunsaturated organic compounds include divinyl benzene, cyclohexadiene, cyclooctadiene, dicyclopentadiene, cyclododecadiene, cyclododecatriene, isoprene, 1,5-hexadiene, butadiene, polybutadiene, polyisoprene, and the like. Glycidyl ethers of polyvalent alcohols include glycidyl ethers of neopentyl, ethylene, propylene, and butylene glycol, trimethylol-propane, 2-ethyl-1,3-hexanediol, 2,2-diethyl-1,3-propanediol, 2-butyl-2-ethyl-1,3-propanediol, 1,6-hexanediol, 1,4-butanediol, 1,3-propanediol, 1,5-pentanediol, 1,8-octanediol, 1,10-decanediol, 1,12-dodecanediol, 1,2-cyclohexanediol, 1,4-cyclohexane-diol, 1,4-cyclohexane dimethanol, glycerin, sorbitol, pentaerythritol, and the like. Glycidyl ethers of polymeric polyvalent alcohols are also suitable and include the glycidyl ethers of polyethylene glycol, polypropylene glycol, polybutylene glycol, the various copolymers of ethylene, propylene, and butylene oxides, polyvinyl alcohol, polyallyl alcohol, and the like. The glycidyl derivatives include triglycidyl isocyanurate.

The glycidyl derivatives of hydantoin and hydantoin derivatives include structures shown below where R1 and R2 are alkyl chains of 1 to 4 carbons, or R1 and R2 represent a single tetramethylene or pentamethylene chain.

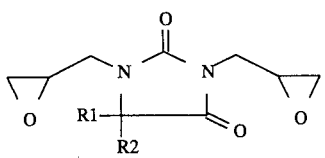

Glycidyl ethers of polyhydric phenols include the glycidyl ethers of dihydric phenols, including resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (more commonly known as bisphenol A), and bis-(4-hydroxyphenyl)-methane (more commonly known as bisphenol F, and which may contain varying amounts of 2-hydroxyphenyl isomers), and the like. Also useful are the advanced dihydric phenols of the following structure:

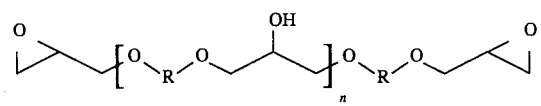

where n is an integer, and R is a divalent hydrocarbon radical of a dihydric phenol, such as the dihydric phenols listed above. Such materials are prepared by polymerizing mixtures of the dihydric phenol and epichlorohydrin, or by advancing a mixture of the diglycidyl ether of the dihydric phenol and the dihydric phenol. While in any given molecule the value of n is an integer, the materials are invariably mixtures which can be characterized by an average value of n which is not necessarily a whole number. Useful in this invention are polymers with a value of n between 0 and about 7. Also useful in this invention are the epoxy novolac resins, which are the glycidyl ethers of novolac resins. Novolac resins are the reaction product of a mono- or dialdehyde, most usually formaldehyde, with a mono or polyphenolic material. Examples of monophenolic materials which may be utilized include phenol, the cresols, p-tert-butylphenol, nonylphenol, octylphenol, other alkyl and phenyl substituted phenols, and the like. Polyphenolic materials include the various diphenols including bisphenol-A and the like. Aldehydes which are utilized for the novolac include formaldehyde, glyoxal, and the higher aldehydes up to about $C_4$. The novolacs typically are complex mixtures with different degrees of hydroxyl functionality. For the purposes of this invention useful functionalities range from about 2 to about 4.

The preferred low molecular weight polyepoxy compounds are the diglycidyl ethers of bisphenol-A and bisphenol-F, advanced bisphenol-A resins where n is ranges from about 0 to about 1, and epoxy novolacs derived from phenol and formaldehyde with an average functionality of about 2 to about 4. Most preferred are diglycidyl ethers of bisphenol-A and diglycidyl ethers of bisphenol-F.

The intermediate (C) reaction products can be prepared over a wide range of reactant ratios. The amine must be employed in sufficient excess (greater than one mole of polyamine per equivalent of epoxide), so as to minimize chain extension and substantially afford an amine terminated adduct of two molecules of polyamine and one molecule of polyepoxide and to avoid unacceptably high viscosities in the final product. The reactant ratio may be 1.5 to 10 or more moles polyamine per equivalent of epoxide, preferably 2 to 4, desirably about 3 moles/equivalent. Excess polyamine should be removed, preferably via vacuum distillation for volatile polyamines, to yield the isolated adduct of two molecules of polyamine and one molecule of polyepoxide. The excess polyamine should be removed to the extent that intermediate (C) has a free polyamine content of <5% by weight, preferably <2 wt %.

The polyepoxide resins used to adduct intermediate (C) are those types of polyepoxides taught above as suitable for use in making intermediate (C) but having an EEW of 450–2000, preferably 450–700, and most preferably 480–550. It is preferred to use type 1, solid epoxy resins to advance intermediate (C). Adequate performance may be achieved if advancement is made with a liquid resin; however, the level of secondary adduction would need to be high in order to achieve the degree of compatibility observed via adduction with type 1 resins. High molecular weights (EEW>1000) can be used in this invention, but such materials are likely to have an adverse effect on the viscosity of the final product.

Intermediate (C), preferably as the isolated adduct, is further advanced, preferably with a type I solid epoxy resin. The ratio of reactants is such that the amine containing isolated adduct is in excess, namely a ratio of about 0.1 to 0.4 moles epoxy resin per mole intermediate (C). At least 0.2 moles of epoxide per 1 mole of isolated adduct may be required to achieve the desired curing agent performance. At low ratio of adduction (<0.1 mole), the final products do not possess sufficient compatibility with epoxy resin dispersions and coatings exhibit poor surface appearance. Higher ratios of adduction (>0.4 mole) have an adverse effect on final product viscosity.

Specific monoepoxide end capping agents useful in this invention are the aromatic and alkyl substituted aromatic monoglycidyl ethers. (Contemplated as the functional equivalent of the monoglycidyl ethers for purposes of this invention are materials such as styrene oxide). These include phenyl glycidyl ether (PGE), and alkyl phenyl glycidyl ethers containing a C1 to C15 alkyl such as cresyl glycidyl ethers (CGE), t-butyl phenyl glycidyl ether, nonyl phenyl glycidyl ether and the glycidyl ether of cashew nut oil (Cardolite™ NC513). Cardolite NC513 is a phenyl glycidyl ether containing a C15 alkyl group attached to the aromatic ring. Aliphatic mono glycidyl ethers such as those disclosed in U.S. Pat. No. 4,246,148 including butyl glycidyl ether can also be present provided at least 65% aromatic monoglycidyl ether is used.

The purpose of end capping the adduct mixture is to reduce the primary amine content, thereby providing extended pot life. It is also carried out so as to improve system compatibility. The level of end capping agents must be≧1 mole monoepoxide per theoretical primary amine. Levels less than this will result in coating formulations having less than suitable pot lives. The examples of this invention have used end capping levels ranging from 1.0 to 1.5 moles per primary amine, the preferred level is 1.25 moles per primary amine.

Examples of new curing agents of this invention include adducts end capped with phenyl glycidyl ether or cresyl glycidyl ether as the sole end capping agent. Such products exhibit excellent compatibility with the solid epoxy resin dispersions manufactured by Shell Resins (e.g., Shell Epi-rez™ 5522-WY55 and Epi-rez 3520-WY55 resins). Compatibility with other commercial resins such as Hoechst EP384 resin is poorer. If a mixture of PGE or CGE with an alkyl substituted phenyl glycidyl ether, especially where the alkyl group is a C15 unit, is employed, then the resulting curing agents now exhibit excellent compatibility with all three of the commercial epoxy resin dispersions.

Both reactions in the preparation of the hardener can be conducted over a wide temperature range, from about 40° C. to 200° C., with the preferred temperature about 60° C. to 100° C. The reaction can be conducted neat, or in the presence of suitable solvent. The best solvents are solvents that are useful in the formulation of the final coating, such as those described below. The preferred solvents are the glycol ethers described below, and the most preferred solvent is 1-methoxy-2-propanol.

Thus, the curing agents are manufactured in a water soluble glycol ether. After end capping, products may be reduced to 20 to 65%, particularly about 60%, nonvolatiles via the addition of water. Water solubility or dispersibility is achieved by salting the end capped polyamine adduct with a volatile organic or inorganic acid. The degree of salting is selected to control, as desired, a number of factors such as cure temperature, cure speed, pot life and dispersibility. In general, the end capped polyamine adduct is reacted with sufficient acid to achieve a degree of salting from about 2 to about 65%, preferably, from 2 to 20%.

The "degree of salting" means the number of amine nitrogen equivalents reacted with an acid expressed as a percentage of the total number of amine nitrogen equivalents in the system. Thus, a 15% degree of salting means that the end capped polyamine adduct has been reacted with sufficient acid to convert 15% of the amine nitrogens present on the adduct to their corresponding salt.

Suitable volatile acids include both organic and inorganic acids and is and acid which will substantially completely evaporate at the temperature at which drying and curing occur. The volatile organic acids may be aliphatic, cycloaliphatic, or heterocyclic and may be saturated or unsaturated. Representative volatile organic acids include acetic acid, formic acid, propionic acid, butyric acid, acrylic acid, methacrylic acid and cyclohexanoic acid. The organic acid will preferably be an aliphatic monocarboxylic acid having up to 4 carbon atoms. Representative volatile inorganic acids include hydrochloric acid, hydrobromic acid and hydrofluoric acid. The preferred acids are acetic, formic and propionic acids.

The curing agents, or hardeners, of this invention are useful in applications requiring a relatively thin film of cured epoxy resin such as coatings. They are used to cure resins or mixtures of resins containing 1,2-epoxy groups. The epoxy resins or epoxy resin mixture may be liquid or preferably solid in nature, and have an epoxide equivalent weight (EEW) based on solids of from about 150 to about 1000, preferably from about 170 to about 700. Usually the resin mixture will consist of di- or polyepoxide resins, such as those resins previously listed as suitable for use in making the poly(alkylene oxide) amine/epoxide adduct. The epoxy resin mixture may be modified with a portion of monofunctional epoxides such as those also listed above.

The epoxy resin may be used as is, it may be dissolved in an appropriate solvent, or it may be employed as an already formed emulsion or dispersion in water or water/cosolvent blend. It will be recognized by those skilled in the art that the use of solvent or a water/cosolvent blend may be required with solid epoxy resins or extremely viscous liquid epoxy resins. The ratio of epoxy groups in the epoxy resin to active amine hydrogens in the hardener can vary from about 0.5 to about 2, and will depend on the nature of the epoxy resin employed and the properties necessary to meet a certain market requirement. With liquid resin, the preferred range is about 0.9 to 1.3, and with solid resin about 0.8 to 1.6.

Normally, coatings according to this invention will consist of at least two components, one of which contains the epoxy resin, and the other the curing agent. It will usually be advantageous to include one or more organic solvents in one or both components of the coating. The solvents are employed to, for example, reduce the viscosity of the individual or combined components, to reduce the surface tension of the formulation, to aid in coalescence of the ingredients for optimum film formation, to increase pot life, and to increase the stability of one or both components. Particularly useful solvents are the lower molecular weight glycol ethers such as ethylene glycol monopropyl ether, ethylene glycol monobutyl ether, ethylene glycol monoethyl ether, propylene glycol monomethyl ether, propylene glycol monoethyl ether, diethylene glycol monobutyl ether, and the like. Other useful solvents include the aromatic solvents such as xylene and aromatic solvent blends such as Aromatic 100, ketones such as methyl ethyl ketone, methyl isobutyl ketone, esters such as butyl acetate, and alcohols such as isopropyl alcohol and butanol. The preferred solvent is 1-methoxy-2-propanol.

It will frequently be advantageous to include plasticizers such as benzyl alcohol, phenol, tert-butylphenol, nonylphenol, octylphenol, and the like in one or both of the components. Plasticizers reduce the glass transition temperature of the composition and therefore allow the amine and epoxide to achieve a higher degree of reaction than might otherwise be possible. Accelerators for the epoxy/amine reaction may be employed in the formulation. Useful accelerators are well known to those skilled in the art and include acids such as salicylic acid, various phenols, various carboxylic acids, and various sulfonic acids, and tertiary amines such as tris(dimethylaminomethyl)phenol.

The coating formulation may also include pigments and mixtures of pigments. The pigments may be ground into the epoxy resin, the hardener, or both. They may also be incorporated with the use of a pigment grinding aid or pigment dispersant, which may be used in combination with the epoxy resin or the hardener, or may be used alone. The use of pigment dispersants is well known to those skilled in the art of coating formulation.

Other additives may also be included in the coatings formulation. Such additives include defoamers, surfactants, slip and mar aids, rheology modifiers, flow aids, adhesion promoters, light and heat stabilizers, corrosion inhibitors, and the like.

EXAMPLE 1

Preparation of an Isolated Adduct based on TETA and Epon 828™

To a 3 liter, 4 necked round bottom flask, equipped with a mechanical stirrer, thermocouple, nitrogen sparge and dropping funnel was charged 1700g (11.65 mols) of triethylenetetramine (TETA). The contents of the flask was heated to 95° C. at which point 737g (1.95 mols) of Epon 828 diglycidyl ether of bisphenol A (Shell Chemical Co.) was added over a 2 hour period. After the addition was complete the batch was held at this temperature for a further 2 hours and then transferred to a wiped film still. Removal of the excess TETA was achieved by passing the adduct through the still at 150° C./2–4 mm Hg. Rotor blades were set at 400 rpm and the batch introduced at a feed rate of approximately 150 g/hr. After vacuum strip, a sample was analyzed by gas chromatography and found to contain<0.5% free TETA. Recovery of the E828/TETA adduct was equivalent to 98.5% of the theoretical yield.

EXAMPLE 2

Preparation of End Capped Adduct based on Phenyl Glycidyl Ether and Cashew Nut Oil Glycidyl Ether To a 500 ml, 4 necked round bottom flask, equipped with a mechanical stirrer, thermocouple, condenser, nitrogen sparge and a dropping funnel was placed 168 g (0.25 mols) of the isolated adduct of triethylenetetramine (TETA) and Epon 828 epoxide as prepared in Example 1. A nitrogen sparge was begun and the material heated to 95° C. followed by the addition of 80.0 g of 1-methoxy-2-propanol (Dowanol™ PM). While maintaining this temperature, 49.0 g (0.05 mols) of a DER 671 resin (EEW 490) in 49.0g of Dowanol PM solution were charged to the reactor over a 2 hour period. After the addition was complete, the mixture was allowed to react at the above temperature for a further one hour. To a 500 ml dropping funnel were charged 66.0 g (0.4 mols) of phenyl glycidyl ether and 49.0 g (0.1 mols) of cashew nut oil glycidyl ether (Cardolite NC513). The mixture was charged to the polyamine/epoxy adduct solution over a period of about one hour, while maintaining a reaction temperature of 95°–105° C. The mixture was held at 95° C. for an additional 60 minutes, at which point a mixture of 79.0 g water and 13.3 g glacial acetic acid was then added. After thorough mixing (30 minutes), the batch was cooled to 70° C. and then filtered. The resulting homogeneous product had a non-volatile content of 60.3%, viscosity 11,700 cps @ 25° C. and a color of Gardner 8. The theoretical hydrogen equivalent weight [HEW] for the amine curing agent was approximately 174 based on solids.

EXAMPLE 3

This Example shows additional end capped polyamine/epoxy adducts prepared following the procedure of Examples 1 and 2.

TABLE 1

| Example | 3A | 3B | 3C | 3D | 3E |
|---|---|---|---|---|---|
| E828/TETA | — | 168.0 | 168.0 | — | 159.2 |
| DER354/TETA[1] | 66.2 | — | — | — | — |
| E828/DETA[2] | — | — | — | 142.8 | — |
| DER 671/PM50 | — | 98.0 | 98.0 | 95.6 | 92.8 |
| PGE | — | — | — | 64.3 | 62.5 |
| CGE | 36.4 | 91.0 | 72.8 | — | — |
| NC513[3] | — | — | 49.0 | 47.6 | — |
| tBPGE[4] | — | — | — | — | 22.3 |
| Methoxy propanol | — | 70.6 | 82.5 | 70.2 | 73.9 |
| Propoxy ethanol | 31.2 | — | — | — | — |
| Acetic acid | 3.1 | 12.3 | 13.6 | 12.1 | 11.6 |
| Water | 34.2 | 73.3 | 80.7 | 72.1 | 69.2 |
| Properties | | | | | |
| Viscosity* | 1,890 | 15,300 | 12,600 | 9,620 | 18,900 |
| [HEW] solids | 123 | 162 | 177 | 225 | 163 |

[1]Isolated adduct of DER 354 (diglycidyl ether of bisphenol F) and triethylenetetramine.
[2]Isolated adduct of E828 (diglycidyl ether of bisphenol A) and diethylenetriamine, prepared in a similar manner to the isolated adduct of Example 1.
[3]Cardolite NC513-cashew nut oil glycidyl ether from Cardolite Corp.
[4]tBPGE-tert-butyl phenyl glycidyl ether.
*cps @ 25° C.

EXAMPLE 4

A series of formulated epoxy coating compositions was prepared using the curing agents described in Examples 2 and 3 with several commercially available solid epoxy resin dispersions. Initial product screening included (a) assessing the prepared formulations for viscosity stability and (b) examining the surface appearance and gloss consistency of the cured coatings. The data is presented in Table 2. All formulations were prepared using a 50% stoichiometric excess of epoxy resin dispersion. This is considered an optimum level for improved water resistance, but is not limiting. Variation in stoichiometry in order to achieve different performance properties is common knowledge in the industry for this class of coating. VOC levels were set at 1.8 lb/gal (216 g/l).

TABLE 2

| | | System Stability** | | Film Properties | |
|---|---|---|---|---|---|
| | | Initial | | | |
| Curing Agent # | Resin Dispersion* | Viscosity, sec ($T_{0.5\ hr}$) | Final Viscosity, sec ($T_{6\ hr}$) | Surface Appearance | Clarity |
| 2 | Epi-rez 5522 | 28.0 | 30.9 | smooth | excellent |
| 2 | Epi-rez 3520 | 26.4 | 23.2 | smooth | excellent |
| 2 | EP384 | 27.3 | 25.9 | smooth | excellent |

TABLE 2-continued

| | | System Stability** | | Film Properties | |
| | | Initial | | | |
| Curing Agent # | Resin Dispersion* | Viscosity, sec ($T_{0.5\ hr}$) | Final Viscosity, sec ($T_{6\ hr}$) | Surface Appearance | Clarity |
| --- | --- | --- | --- | --- | --- |
| 3A | Epi-rez 5522 | 25.3 | 18.7 | smooth | excellent |
| 3A | Epi-rez 3520 | 26.9 | 21.4 | grainy | hazy |
| 3A | EP384 | | not compatible | | |
| 3B | Epi-rez 5522 | 26.7 | 31.5 | smooth | excellent |
| 3B | EP384 | 27.3 | 25.1 | grainy | good |
| 3C | Epi-rez 5522 | 27.9 | 31.9 | smooth | excellent |
| 3C | EP384 | 27.2 | 26.5 | smooth | excellent |
| 3D | Epi-rez 5522 | 26.2 | 22.6 | smooth | excellent |
| 3E | Epi-rez 5522 | 26.4 | 26.8 | smooth | good |
| 3E | EP384 | 26.8 | 25.0 | slightly grainy | good |

*Epi-rez 5522 (EEW 625) and Epi-rez 3520 (EEW 525) from Shell Resins. EP384 (EEW 525) from Hoechst-Celanese.
**Viscosity determined using a Zahn #2 flow cup.

Examination of the data in Table 2 indicates that Example 3A, which is a curing agent not advanced with a solid epoxy resin did not have the desired degree of resin compatibility with the Epi-rez 5522 epoxy dispersion. This system exhibited poor viscosity stability as is shown by a significant decrease in viscosity over the 6 hr pot life. Although viscosity stability was poor, this system still gave rise to smooth, high gloss coatings throughout the pot life. When used in combination with the EP384 dispersion, Example 3A was completely incompatible and as a result it was not possible to form a continuous coating from this system. All remaining curing agent examples were partially adducted with a solid epoxy resin and as can be seen from the viscosity data, formulated systems exhibited excellent viscosity stability over a 6 hr period.

The next important observation relates to coating quality. Examples that did not contain the Cardolite NC513 epoxide as part of the end capping unit, gave rise to excellent coatings when used to cure Epi-rez 5522 and 3520 resins. However, when formulated with EP384 resin, the resultant pot lives were very short. After 60 minutes from the initial point of mixing, applied coatings began to develop a grainy texture as the co-solvents and water evaporated from the film. The grainy appearance got progressively worse through the course of the pot life. Despite the poor surface appearance, coatings still retained a high degree of gloss (>100, 60° specular).

Curing agent examples that were partially adducted with a solid resin and also contained the C15-alkyl substituted phenyl glycidyl ether (Cardolite NC513) as part of the polymer backbone, exhibited excellent compatibility with the solid resin dispersions mentioned above. Viscosity stability of the formulated systems and coating quality were superior to systems prepared using development curing agents that were free from the above raw materials. Coating formulations and system properties for this class of curing agent are described in more detail in Example 5.

EXAMPLE 5

This Example presents clear coat formulations based on the polyamine/epoxy adduct of Example 2. Table 3 details the clear coating compositions and Table 4 presents the performance data obtained for each system and on the cured coatings.

TABLE 3

| | 5A | 5B | 5C |
| --- | --- | --- | --- |
| A Component | | | |
| Shell 5522-WY55 | 138.5 | — | — |
| Shell 3520-WY55 | — | 135.0 | — |
| Hoechst EP 384 | — | — | 139.7 |
| De-ionized water | 10.6 | 13.3 | 7.0 |
| Dowanol PM | 2.1 | 0.4 | 2.1 |
| B Component | | | |
| Example 2 | 23.0 | 26.2 | 26.6 |
| Benzyl Alcohol | 3.6 | 3.6 | 3.6 |
| Dowanol PM | 2.1 | 0.4 | 2.1 |
| De-ionized water | 3.5 | 4.5 | 2.3 |
| Extra de-ionized water | 45.0 | 43.0 | 31.0 |

All systems formulated using a 50% excess of epoxy resin
Benzyl Alcohol added as a plasticizer (4% based on resin solids)
VOC set at 1.8 lb/gal (216 g/l)

The "A" component and "B" component mixtures described in Table 3 were prepared and allowed to stand overnight. The A and B sides were then combined and mixed thoroughly with a spatula and allowed to stand at room temperature for 15 minutes. Sufficient water was then added to reduce the viscosity of the mixture to 26±2 sec. (Zahn #2 flow cup), at which point coatings were applied to 3×6" (7.6×15.2 cm) cold rolled steel 'Q' panels (Q Panel Co.), and 3×6" (7.6×15.2 cm) grit blasted steel panels. Coatings were applied at hourly intervals onto the cold rolled steel panels to check for gloss through the pot life and the viscosity of the bulk mixture was measured at 30 minute intervals to check for viscosity stability. The coatings were all cured at 25° C./ 50% relative humidity. Gloss was measured after 24 hours and cross hatch adhesion (wet & dry), and coating hardness were measured after a 14 day cure. Wet adhesion was determined after placing coatings in a Cleveland Humidity cabinet and exposing the coating to constant humidity (@ 43° C.), for 24 hours. Cross hatch adhesion was measured 15 minutes after removal from the cabinet and rated in accordance with ASTM D3359 (adhesive tape method).

Performance data obtained for the new curing agents are presented in Table 4 and a comparison is made with three commercial epoxy resin/amine hardener systems (I–III). Systems I–III were formulated in a similar manner to Examples 5A–C.

TABLE 4

| Properties | Formulations | | | Competitive Waterborne Systems | | |
|---|---|---|---|---|---|---|
| | 5A | 5B | 5C | I | II | III |
| Pot Life via Gloss (hr) | 6 | 6 | 6 | 6 | 6 | 3 |
| Pot Life via Viscosity (hr) | 6 | 6 | 6 | 6 | 6 | 6 |
| Average Gloss (60° specular) | 125 | 130 | 130 | 125 | 132 | 123 |
| Pendulum Hardness (14 days) | 77 | 73 | 65 | 90 | 80 | 70 |
| Impact resistance (inch lb) | 160 | 100 | 36 | 160 | 100 | 32 |
| Reverse impact (inch lb) | 120 | 20 | 4 | 160 | 20 | 2 |
| Tack Free Time (min) | 50 | 150 | 120 | 90 | 420 | 180 |
| Cross Hatch Adhesion (Dry) | | | | | | |
| Cold Rolled Steel | 5B | 5B | 5B | 5B | 5B | 5B |
| Grit Blasted Steel | 5B | 5B | 5B | 5B | 5B | 5B |
| Cross Hatch Adhesion (Wet) | | | | | | |
| Cold Rolled Steel | 0B | 0B | 5B | 0B | 0B | 0B |
| Grit Blasted Steel | 5B | 5B | 5B | 5B | 5B | 5B |
| Pore Resistance (EIS, 24 hr M Ω) | 500 | 430 | 340 | 98 | 38 | 2000 |

System (I) Shell Epi-rez 5522/Epi-cure 8290
System (II) Shell Epi-rez 3520/Epi-cure 8537
System (III) Hoechst EP384/EH623
Cross Hatch Adhesion rating:
5B-excellent, no loss;
0B-poor, complete failure Analysis of the data in Table 4 shows that the performance properties of coatings based on the curing agents of this invention were equivalent or superior to competitive waterborne systems. Certain performance enhancements were observed; noticeably the faster tack free times and improved water resistance. Clear coats have been evaluated by Electrochemical Impedance Spectroscopy (ELS). This technique gives an indication of the barrier properties of a coating. Pore resistance (resistance to ionic penetration) is an order of magnitude higher for the clear coat formulations 5A and 5B compared to the competitive systems I and II. Excellent pore resistance was also achieved for system 5C. Although the pore resistance of 5C was an order of magnitude lower than system III which is based on the same epoxy resin dispersion, 5C exhibited superior performance properties. These included outstanding wet adhesion on cold rolled steel, higher gloss and a longer pot life.

STATEMENT OF INDUSTRIAL APPLICATION

The present invention provides water dispersible curing agents for liquid and solid epoxy resin coating compositions.

I claim:

1. An epoxy resin curing composition comprising the product of the reaction of (A) a polyamine containing primary amine functionality and (B) a polyepoxide having an EEW of 130 to 450 in a ratio of moles of polyamine per equivalents of polyepoxide sufficient to provide an intermediate (C) comprising an adduct of about two moles of polyamine and one mole polyepoxide, intermediate (C) being then reacted with a polyepoxy resin (D) having an EEW of 450 to 2000 in an amount sufficient to react with about 10–40% of the primary amines in intermediate (C) to provide a polyamine-polyepoxide adduct (E), and adduct (E) being end capped with a monoepoxide composition comprising an aromatic glycidyl ether or an alkyl substituted aromatic glycidyl ether, or both.

2. The composition of claim 1 in which 1.5 to 10 or more moles of polyamine (A) are reacted per equivalent of polyepoxide (B) to make intermediate (C).

3. The composition of claim 1 in which the polyamine is a polyethylene polyamine.

4. The composition of claim 1 in which polyepoxide (B) has an EEW in the range of 130 to 350.

5. The composition of claim 1 in which intermediate (C) and polyepoxide (D) are reacted at about 0.1 to 0.4 moles of polyepoxide (D) per mole of intermediate (C).

6. The composition of claim 1 in which polyepoxide resin (D) is a solid epoxy resin.

7. The composition of claim 1 in which the aromatic glycidyl ether is a phenyl glycidyl ether and the alkyl substituted aromatic glycidyl ether is an alkyl phenyl glycidyl ether containing a C1 to C15 alkyl group.

8. The composition of claim 7 in which the alkyl substituted aromatic glycidyl ether is cresyl glycidyl ether, t-butyl phenyl glycidyl ether, nonyl phenyl glycidyl ether or the glycidyl ether of cashew nut oil.

9. The composition of claim 1 which is salted to a degree of 2 to 20% with a volatile acid.

10. The composition of claim 1 in which polyepoxide (B) is the diglycidyl ether of bisphenol-A or bisphenol-F.

11. The composition of claim 1 in which polyepoxide (D) is the diglycidyl ether of bisphenol-A or bisphenol-F.

12. An epoxy resin curing composition comprising the product of the reaction of (A) a polyamine containing primary amine functionality and (B) a polyepoxide having an EEW of 130 to 350 in a 1.5 to 10 ratio of moles of polyamine per equivalents of polyepoxide to provide an intermediate (C) comprising an adduct of about two moles of polyamine and one mole polyepoxide, excess polyamine being removed from intermediate (C) to<5 wt %, intermediate (C) being then reacted with a solid polyepoxy resin (D) having an EEW of 450 to 700 at about 0.1 to 0.4 moles of polyepoxide (D) per mole of intermediate (C) and sufficient to react with about 10–40% of the primary amines in intermediate (C) to provide a polyamine-polyepoxide adduct (E), and adduct (E) being end capped with a monoepoxide composition comprising a phenyl glycidyl ether or an alkyl phenyl glycidyl ether containing a C1 to C15 alkyl group, or both.

13. The composition of claim 12 in which 2 to 4 moles of polyamine (A) are reacted per equivalent of polyepoxide (B) to make intermediate (C).

14. The composition of claim 12 in which the polyamine is a polyethylene polyamine.

15. The composition of claim 12 in which polyepoxide (B) has an EEW in the range of 170 to 250 and polyepoxide (D) has an EEW in the range of 480 to 550.

16. The composition of claim 12 which is salted to a degree of 2 to 20% with a volatile acid which is acetic acid, formic acid or propionic acid.

17. The composition of claim 12 in which polyepoxide (B) is the diglycidyl ether of bisphenol-A or bisphenol-F.

18. The composition of claim 12 in which polyepoxide (D) is the diglycidyl ether of bisphenol-A or bisphenol-F.

19. An epoxy resin curing composition comprising the product of the reaction of (A) a polyethylene polyamine containing primary amine functionality and (B) a polyepoxide having an EEW of 170 to 250 in a 2 to 4 ratio of moles of polyamine per equivalents of polyepoxide to provide an intermediate (C) comprising an adduct of about two moles of polyamine and one mole polyepoxide, excess polyamine being removed from intermediate (C) to<2 wt %, intermediate (C) being then reacted with a solid polyepoxy resin (D)

having an EEW of 480 to 550 at about 0.2 to 0.4 moles of polyepoxide (D) per mole of intermediate (C) and sufficient to react with about 10–40% of the primary amines in intermediate (C) to provide a polyamine-polyepoxide adduct (E), and adduct (E) being end capped with a monoepoxide composition comprising a phenyl glycidyl ether or an alkyl phenyl glycidyl ether containing a C1 to C15 alkyl group, or both.

20. The composition of claim 19 in which polyepoxide (B) is the diglycidyl ether of bisphenol-A or bisphenol-F.

21. The composition of claim 20 in which polyepoxide (D) is the diglycidyl ether of bisphenol-A or bisphenol-F.

22. The composition of claim 21 in which the polyethylene polyamine is triethylenetetramine.

23. The composition of claim 22 which is salted to a degree of 2 to 20% with acetic acid.

24. The composition of claim 23 in which the monoepoxide composition comprises cresyl glycidyl ether, t-butyl phenyl glycidyl ether, nonyl phenyl glycidyl ether or the glycidyl ether of cashew nut oil.

25. An aqueous composition comprising 20 to 65% of the epoxy resin curing composition of claim 1.

26. An aqueous composition comprising 20 to 65% of the epoxy resin curing composition of claim 12.

27. An aqueous composition comprising 20 to 65% of the epoxy resin curing composition of claim 19.

28. An aqueous composition comprising 20 to 65% of the epoxy resin curing composition of claim 24.

29. A coating composition comprising in an aqueous medium a polyepoxide resin and the curing composition of claim 1 in an equivalents ratio of epoxy groups to amine hydrogens of about 0.5:1 to 2:1.

30. A coating composition comprising in an aqueous medium a polyepoxide resin and the curing composition of claim 12 in an equivalents ratio of epoxy groups to amine hydrogens of about 0.5:1 to 2:1.

31. A coating composition comprising in an aqueous medium a polyepoxide resin and the curing composition of claim 19 in an equivalents ratio of epoxy groups to amine hydrogens of about 0.5:1 to 2:1.

* * * * *